(12) United States Patent
Sacks (10) Patent No.: US 6,827,298 B2
(45) Date of Patent: Dec. 7, 2004

(54) ADJUSTABLE FLOW BUBBLER FOR DRIP IRRIGATION SYSTEMS

(75) Inventor: Rael Sacks, Fresno, CA (US)

(73) Assignee: National Diversified Sales, Inc., Lindsay, CA (US)

( * ) Notice: Subject to any disclaimer, the term of this patent is extended or adjusted under 35 U.S.C. 154(b) by 0 days.

(21) Appl. No.: 10/274,173

(22) Filed: Oct. 18, 2002

(65) Prior Publication Data

US 2004/0074997 A1 Apr. 22, 2004

(51) Int. Cl.[7] .............................................. B05B 15/00
(52) U.S. Cl. ........................ 239/542; 239/569; 239/443
(58) Field of Search ................................ 239/542, 580, 239/582.1, 583, 581.1, 569, 565, 536, 443, 444, 551

(56) References Cited

U.S. PATENT DOCUMENTS 5,050,800 A * 9/1991 Lamar ......................... 239/201
5,054,690 A * 10/1991 Olson ......................... 239/542

OTHER PUBLICATIONS

Jock Dempsey, "Commercial Benders," Internet, 1998.
"Manufacturers of Tube, Pipe, and Profile Bending Equipment," Internet, 2002, CML USA Inc Ercolina.
Chris Ray, "Bending Circles and Arcs with a Hiossfeld Bender," Internet, 1999, ArtMetal.
"Hossfeld Universal No.2 Bender," Internet.
"Hossfeld Pipe & Tube Benders," Internet, Jenness Woodkuts Co., Inc.
Agrifim product Information for Maxi–Flo, Power–Flo and Cuarto–Flo drip bubblers, Internet, US.
Orbit product Information, "DripMaster Product Catalog" for DripMaster manifolds. Internet, US.
Pepco Irrigation product information for bubbler watering system, Internet, US.
Netafim product information for Pressure Compensating P.C. Dripper, Internet, US.

* cited by examiner

Primary Examiner—Thomas Denion
Assistant Examiner—Zelalem Eshete
(74) Attorney, Agent, or Firm—Richard A. Ryan (57) ABSTRACT

A drip irrigation water distribution device having a housing with a top, bottom and side wall forming a chamber therein. The bottom of the housing has a rotatable coupling attached thereto and configured for attachment to a water conduit member, such as a riser, to allow water under pressure to enter the bubbler. A plurality of valves are disposed in valve openings in the housing. Each valve is in corresponding relationship with a valve receiving member that has an opening in communication with the chamber and a discharge passage. An outlet member connects to a distribution line. The opening is configured to receive a reduced section of the valve to selectively allow water to flow to the discharge passage. The opening is securely closed by lowering the reduced section until it tightly abuts against the opening. An integral screen is included to filter debris in the water supply.

20 Claims, 5 Drawing Sheets

ADJUSTABLE FLOW BUBBLER FOR DRIP IRRIGATION SYSTEMS

BACKGROUND OF THE INVENTION

A. Field of the Invention

The field of the present invention relates generally to adjustable water distribution apparatuses utilized in irrigation systems. More particularly, the present invention relates to bubblers used to transfer fluid to one or more irrigation lines so as to deliver a controlled flow of such fluid to plants. Even more particularly, the present invention relates to such apparatuses that are primarily intended for drip irrigation systems and the like.

B. Background

Irrigation systems have generally been in use for thousands of years. A more recent improvement on irrigation systems, but still in use for many years, is the use of drip irrigation systems to more specifically direct water to the plant or plants where irrigation is desired. Drip irrigation systems better control the use and placement of water than non-drip irrigation systems by precisely placing the water at the plants where it is needed. In addition, drip irrigation systems are often specifically configured to allow for irrigation with very low flow rates. As a result, drip irrigation systems generally require somewhat less water than non-drip irrigation systems, which makes it particularly popular in the more arid regions of the world.

A typical drip irrigation system connects to a source of water and distributes a controlled quantity of that water through one or more distribution lines. The typical distribution line is a tubing made out of polyethylene, polyvinylchloride (PVC) and like materials. The distribution line can be open at the distal end to deliver water to a plant at the end of the line, often used with a device to keep bugs and debris from entering the line, or it can be closed at the distal end and utilize one or more flow control devices, known as emitters, along the line in a series arranged at the general position of the plants to be irrigated. Water flows from the source through the distribution lines towards the plants to be watered by that line, exiting the line at the end of the distribution line or at emitters placed along the line. As is well known, most sources of water are likely to contain particles and contaminants that can plug up the distribution lines or emitters disposed therein. Therefore, it is generally necessary to utilize some type of filter to keep such materials away from the distribution lines and emitters.

The typical drip irrigation system has multiple distribution lines. As a result, a water distribution apparatus in the form of a manifold-type device is required to distribute the source of water to the various distribution lines. Although the apparatus can be as simple as a device that receives water and allows it to flow pursuant to standard flow and pressure principles to the multiple lines, a more controlled apparatus is generally desired to prevent non-selective flow disparity between the distribution lines. As is well known, absent any other flow control mechanisms, the amount of water flowing through the a distribution line will be based on the pressure of the source water and the length of the line, number of emitters and the use or non-use of other flow control devices along the line compared to other lines. These factors may result in flow rates, whether equal or unequal, along the distribution lines that are not reflective of that which is the most beneficial for the plants. To solve this problem, the typical drip irrigation system will comprise an manifold-type apparatus to control the flow rates to the individual distribution lines. In the drip irrigation industry, these apparatuses are commonly referred to as bubblers.

Manifold-type devices for distributing fluid to a plurality of distribution lines are set forth in the prior art. For instance, U.S. Pat. No. 5,222,671 to Smiley describes a fluid distribution apparatus for connection to a source of water having multiple distribution lines connected to the apparatus at an elbow that is configured to receive water from the source of water. This apparatus utilizes replaceable fluid control elements configured for certain flow rates and a flexible diaphragm to regulate the pressure, which fluctuates from the source, inside the apparatus. This particular apparatus does not provide an easily adjustable flow rate control, including the ability to completely shut-off the flow if desired. Another manifold apparatus is described in U.S. Pat. No. 5,054,690 to Olson. This apparatus utilizes a plurality of sleeve members configured to receive an emitter adapter to control the flow rate through the distribution lines. If no flow is desired through a particular outlet, a plug device is placed at the upper end of the passage to block the passage. The Olson patent also shows the use of a screen-type filter disposed in the central portion of the apparatus under the screw-on cap to filter the water before it enters the emitter passage. Like the Smiley patent, the Olson device also does not provide for easy adjustment of the flow rates through the apparatus. Even when changes in the flow rated can be made, these devices only allow for discrete changes from one specific flow rate to another, as opposed to variable flow rates. In addition, the devices described in both of these patents utilize a female threaded connector that is directly screwed onto either the housing or a part of the housing. Because the distribution lines are attached to the connectors on the housing, thereby preventing sufficient rotation of the apparatus to unscrew it from the riser, this configuration is a problem if the user desires or needs to remove the apparatus from the water supply line. As a result, the user must either pull the lines off the connector, which can be very difficult, or cut the lines in order to remove the apparatus from the system.

Orbit Irrigation Products, Inc. out of Bountiful, Utah has a manifold they sell under the DripMaster® brand that is referred to as the Apollo 8 Manifold. This manifold utilizes individual control of the eight ports by utilizing a coin or screwdriver-type device to adjust a ramp-type valve mechanism so as to increase or decrease flow through the swivel elbows attached to the housing. Although the flow rate is somewhat easily adjusted from the top of the manifold, the configuration of the valve is such that it is not able to be completely closed (i.e., no flow), thereby requiring the use of a threaded cap at the distal end of the swivel elbow to provide a positive seal when no fluid is desired to pass through that elbow. The Orbit manifold has a separate center mounted filter that can removed for cleaning. In addition to the inability to completely seal the port by adjusting the valve, this particular apparatus requires the user to keep up with and manipulate a relatively significant number of small pieces of equipment (such as the threaded caps). As with the Smiley and Olson patents, the Orbit manifold attaches directly to the source water pipe, also requiring the user to pull off or cut the distribution lines from the swivel elbow if it becomes necessary to disconnect the manifold from the pipe.

The various prior art fluid distribution apparatuses for drip irrigation systems, including those identified above, have disadvantages that affect the functionality and usefulness of the apparatuses. Therefore, what is needed is a fluid distribution apparatus/bubbler that overcomes these disadvantages. The preferred apparatus should be easy to use and adaptable to typical drip irrigation systems. To be effective, such an apparatus should allow the user to easily adjust the flow rate for each outlet individually, completely shut-off one or more outlets without the need of plugs or similar devices, include a built-in screen and be removable from the water source pipe without having to pull or cut any distribution lines. In addition, the preferred apparatus should prevent unintentional complete removal of the valve assembly and allow the user to operate the valve so as to flush undesirable debris and contaminants from the drip irrigation system.

SUMMARY OF THE INVENTION

The adjustable flow bubbler of the present invention solves the problems identified above. That is to say, the present invention discloses a new and useful flow distribution apparatus particularly configured for drip irrigation systems and the like that allows the user to independently adjust multiple outlets to obtain variable flow rates, including no flow. The adjustable flow bubbler of the present invention has a water source pipe adapter that allows removal of the apparatus without having to pull or cut any of the distribution lines and an integral filter to screen any debris in water from interfering with the distribution lines and flow emitters in the lines. Unlike prior art devices, any debris that gets into the bubbler of the present invention can be flushed out by fully opening the valve. The adjustable flow bubbler of the present invention eliminates the need for caps on the ends of the outlets to shut-off water flow when an outlet is not in use and eliminates the need for a separate screen component. The adjustable flow bubbler of the present invention is configured to prevent the user from accidently removing the valve from the housing.

In the preferred embodiment of the present invention, the bubbler is particularly configured for use in a drip irrigation system having one or more distribution lines, although it may be useful for other types of low flow applications. The preferred bubbler has a housing having a top, a bottom and a side wall forming an interior chamber therein. The top can be part of a cap member and the bottom can be part of a base member that are joined together to form the chamber. A spacer member attaches to, such as being integral with, the bottom of the housing and has an inlet passage therethrough that is in fluid communication with the interior chamber and, when installed in a drip irrigation system, to the water conduit member, such as a riser, configured for attachment of the bubbler. A coupling rotatably connects the spacer member to the water conduit member so the distribution lines do not have to be disconnected from the bubbler when it is necessary to remove the bubbler from the drip irrigation system (for example to clean the filter described below). The top of the housing has a plurality of valve openings that are in communication with the interior chamber. A valve having a reduced section extending generally downward into the interior chamber is threadably received in the valve openings. A valve receiving member attached to the bottom of the housing in the interior chamber has an opening that is in fluid flow connection with the interior chamber and in corresponding relationship with the valve. The opening is configured to receive the reduced section of the valve and is hydrologically connected to a discharge passage having an outlet member configured for attachment to one of the distribution lines. The valve and valve opening are configured to allow the reduced section of the valve to move upward and downward relative to the valve receiving member so as to selectively open or close the opening and the reduced section is configured to securely close the opening when the reduced section abuts the opening in the valve receiving member. The valve can be operated such that it is in a full open position to flush any debris or contaminants past the valve and out of the housing. In addition, in the preferred embodiment, the valve is received in the valve opening from below and a shoulder on the valve prevents unintentional complete removal of the valve from the housing.

The bubbler has a spacer member attached to the bottom of the housing to allow room for the outlet members and an inlet passage in the spacer member for the water to flow from the conduit to the interior chamber. To assist in assembly, the cap member has one or more alignment ridges and the base member has an inner wall with one or more alignment slots corresponding to the alignment ridges such that one of the alignment ridges is received in one of the alignment slots when the cap member and the base member are joined to form the interior chamber. The base member side wall and inner wall form a groove for receiving the cap member therein when the cap member and the base member are joined together.

Accordingly, the primary objective of the present invention is to provide an adjustable flow bubbler for drip-type irrigation systems that overcomes the disadvantages associated with the presently available flow distribution apparatuses and bubblers for such systems.

It is also an important objective of the present invention to provide a bubbler for drip irrigation systems and the like that allows easy individual adjustment of the flow rate through the outlets connected to the bubbler and allows the selection of no flow.

It is also an important objective of the present invention to provide a bubbler for drip irrigation systems and the like that allows the user to completely seal individual outlets to prevent flow through the outlet without disassembling the bubbler housing.

It is also an important objective of the present invention to provide a bubbler for drip irrigation systems and the like that allows the user to remove the apparatus from its water source line without having to pull or cut any of the irrigation distribution lines.

Another important objective of the present invention is to provide a bubbler for drip irrigation systems and the like that eliminates the requirement for separate plugs at the ends of the outlets to shut-off flow of water through the outlet and the need for a separate filter component.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in the accompanying figures, the preferred embodiments of the present invention are set forth below. In the preferred embodiment of the present invention, the adjustable flow bubbler of the present invention, identified generally as 10, is configured for attachment to a drip irrigation system having one or more water conduit members. A typical drip irrigation system, shown as 12 in FIG. 1, includes water conduit 14 connected to a supply of water (not shown) having a T-shaped fitting 16 disposed therein and a riser member 18 connected to fitting 16 and rising vertically therefrom to connect to bubbler 10. As is known in the art, bubbler 10 can be positioned such that it is above the earth's surface or below ground with a case or cover (not shown) over bubbler 10 that allows access to bubbler 10 from above and can connect to a 90° or other angle elbow. As explained in more detail below, one or more water distribution lines 20 connect at their proximal end 22 to bubbler 10 and extend outwardly therefrom to plants 24. Distribution lines 20 can be positioned above ground level, as shown, or below ground level and can be configured to discharge water from their distal ends 26 at or near plants 24 or from one or more emitters 28 disposed in line 20 substantially adjacent to a row or group of plants 24. If configured to discharge water from its distal end 26, system 12 can include one or more support stakes 30 positioned at or near plant 24 and configured to hold line 20 in place near plant 24.

Figure 1:
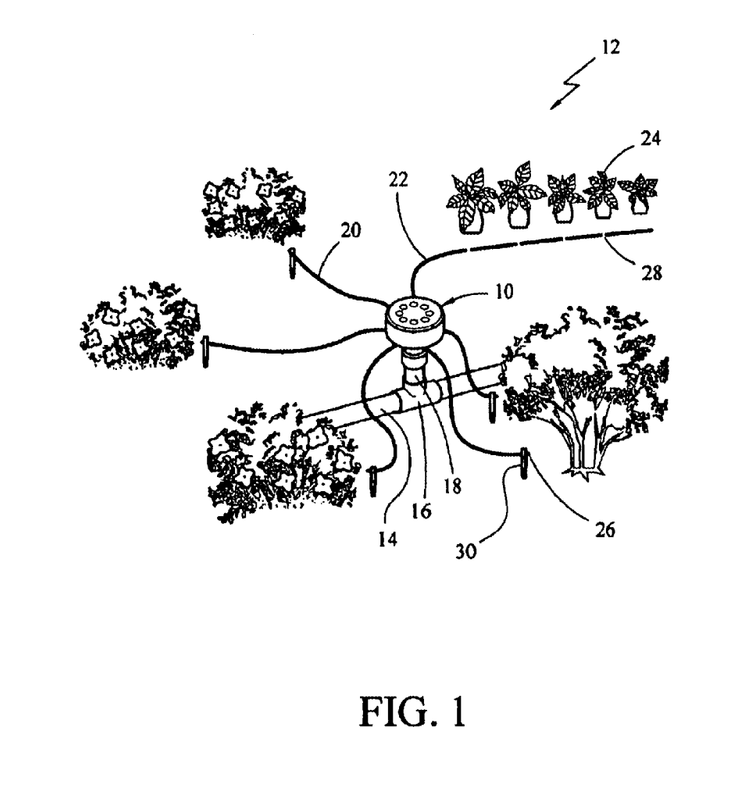
FIG. 1 schematic view of a typical drip irrigation system utilizing the bubbler of the present invention.
Figure 2:
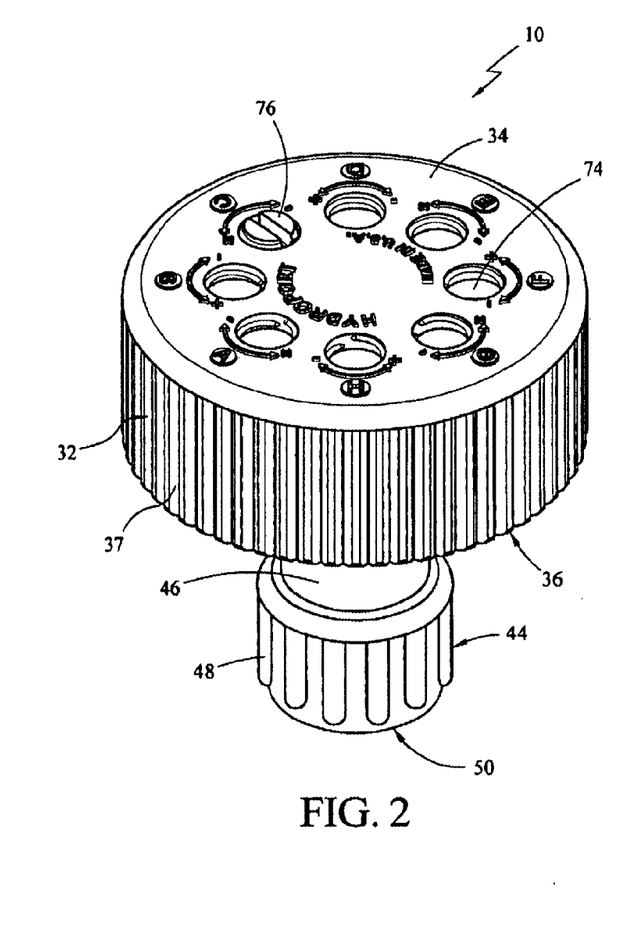
FIG. 2 is an isometric view of the bubbler of the present invention.
Figure 3:
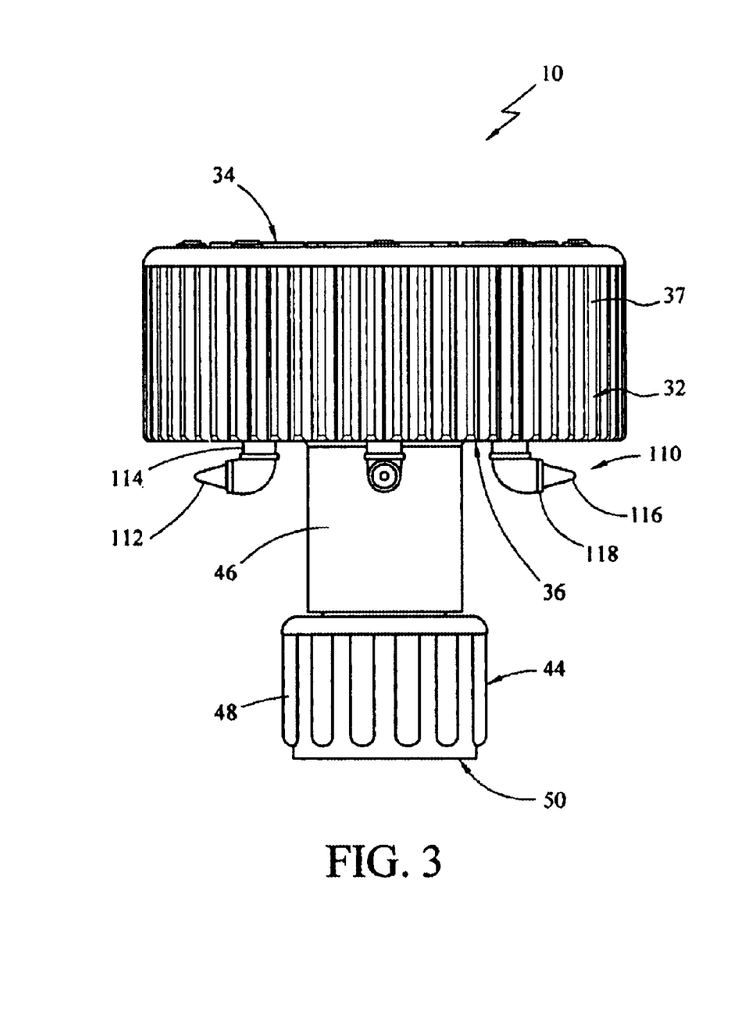
FIG. 3 is a side view of the bubbler of the present invention with the outlet members attached to the bottom of the housing.
Figure 4:
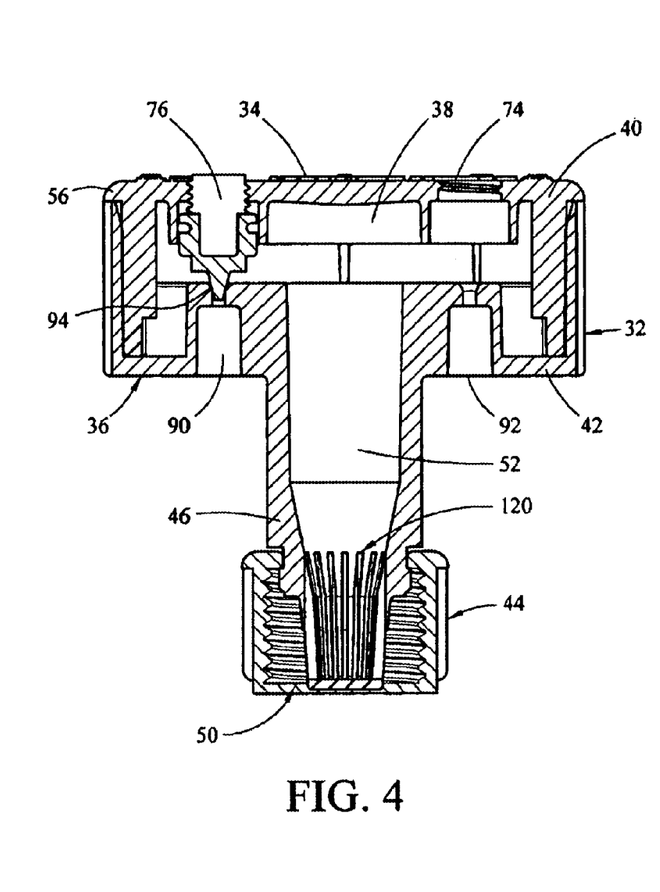
FIG. 4 is a cut-away side view of the bubbler of the present invention.

As best shown on FIGS. 2 through 4, bubbler 10 comprises housing 32 having a top 34, bottom 36 and side walls 37 forming interior chamber 38 therein between. In the preferred embodiment, housing 32 is made up of a cap member 40 (shown separately in FIGS. 5 and 6) and base member 42 (shown separately in FIGS. 7 and 8), which are described in more detail below. As is well known in the art, housing 32 should be made out of materials suitable for use in outdoor environments, including placement in below ground configurations, where it will be exposed to the sun, rain, dirt and a variety of potential lawn care chemicals. These materials include polypropylene, polyvinylchloride (PVC) and like materials. Housing 32 should also be configured to attach to water conduit 14 in water supply system 12, such as shown in FIG. 1, by a mechanism that is appropriate for the particular water supply system or other source of fluid to be distributed by bubbler 10 to the one or more distribution lines 20. A typical drip irrigation system 12 utilizes riser member 18, such as a ½" pipe thread riser having a male threaded connection, to connect to bubbler 10. To connect to riser 18, housing 32 should comprise a like sized internally threaded female connection, such as coupling 44 connected to the bottom 36 of housing 32. In the preferred embodiment, spacer member 46 is disposed between bottom 36 and coupling 44 to space coupling 44 sufficiently below bottom 36 to provide room for the connectors that connect to distribution lines 20 and to provide for a filter mechanism, as described below. In the preferred embodiment, coupling 44 is rotatably mounted on spacer 46 such that it will rotate independent of spacer 46 and housing 32 such that coupling 44 can be threaded on and off of riser 18 without the need to rotate housing 32. As discussed above, this will allow bubbler 10 to be mounted on or removed from riser 18 without requiring pulling or cutting distribution lines 20 off of the connectors which attach lines 20 to housing 32. As shown in FIGS. 2 and 3, coupling 44 can also include a grasping mechanism, such as ridges 48 on the outer surface of coupling 44, that allows the user to easily grasp and rotate coupling 44 with his or her hand or appropriate tools. Coupling 44 also comprises an inlet port 50 to hydraulically connect water conduit 14 of the water supply system to interior chamber 38 of bubbler 10 via passage 52 such that water will flow under pressure from conduit 14 through riser 18, coupling 44 and spacer 46 to chamber 38. From chamber 38 the water will be selectively distributed to one or more distribution lines 20 to provide water to plants 24.

Figure 5:
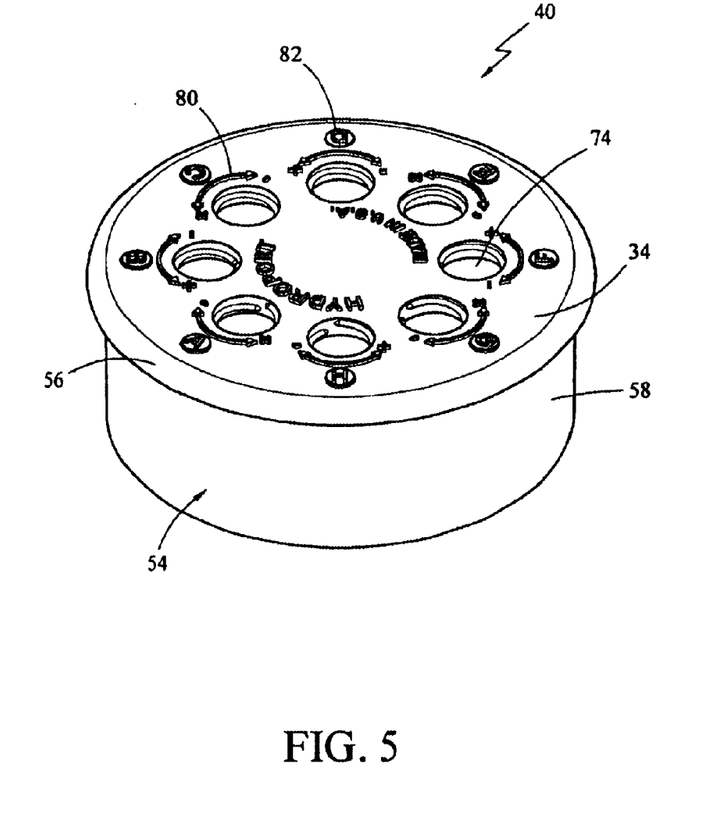
FIG. 5 is an isometric view of the cap member of the present invention.
Figure 6:
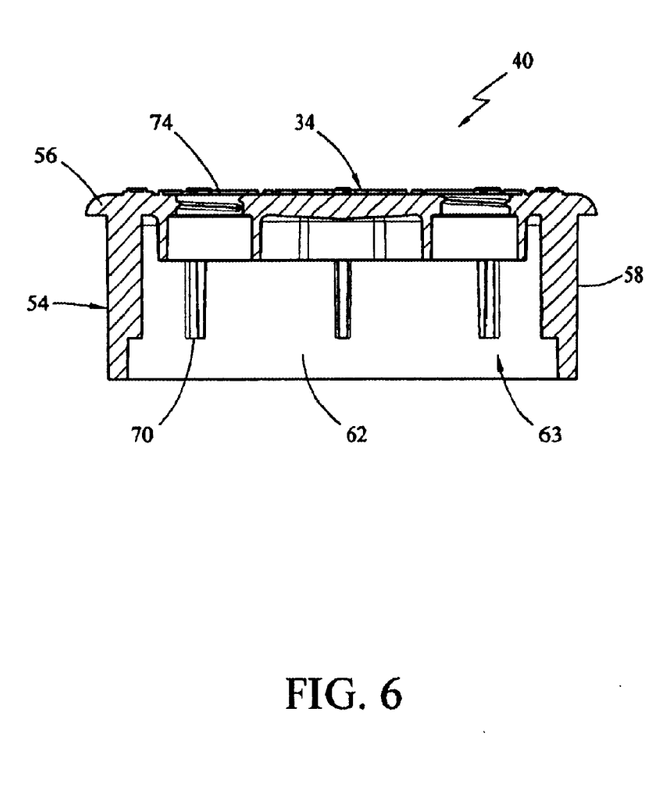
FIG. 6 is a cut-away side view of the cap member of the present invention.
Figure 7:
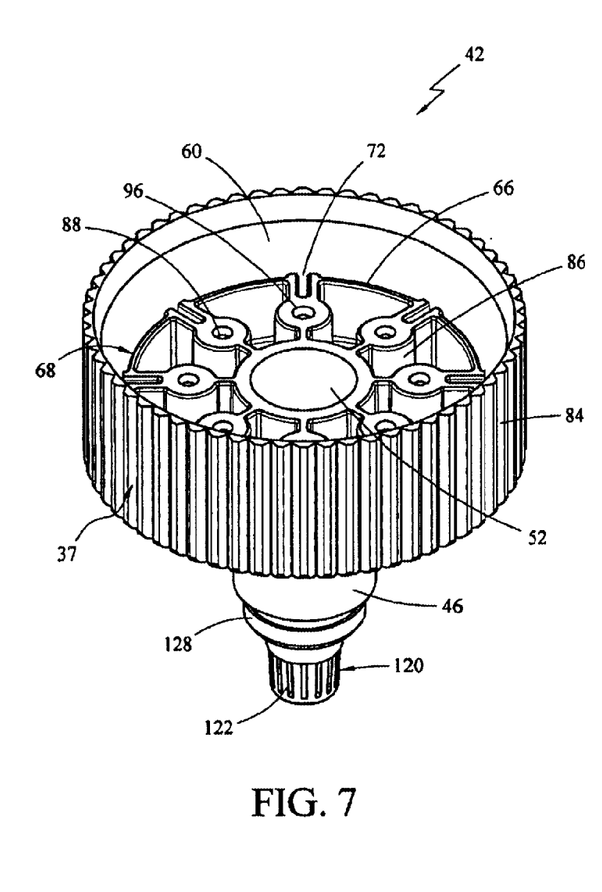
FIG. 7 is an isometric view of the base member of the present invention without the coupling attached to the spacer member.
Figure 8:
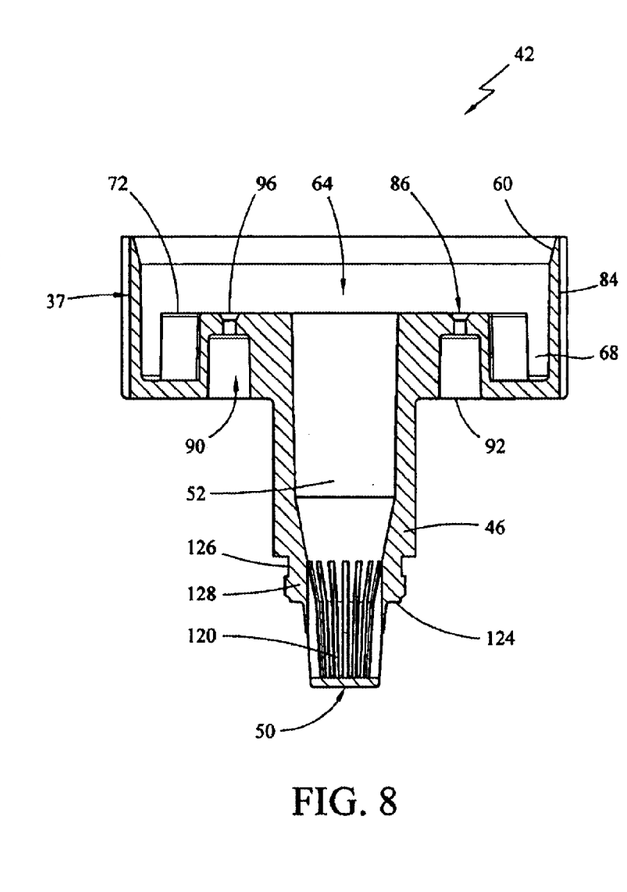
FIG. 8 is a cut-away side view of the base member shown in FIG. 7.

To form enclosed chamber 38, cap 40 should be sized and configured to interconnect with base 42 to form an integral housing 32. One such interconnection comprises a portion of cap 40 being sized and configured to be attached to or received in base 42 and connected thereto by solvent welding, sonic bonding, adhesives or other mechanism appropriate for cap 40 and base 42 and the materials used for these components. As shown in FIGS. 4, 5 and 6, cap 40 can be configured to have a cap wall 54 extending generally downward from top 34 and lip 56 extending generally outward from top 34. In the preferred embodiment of the present invention, cap wall 54 has an exterior side 58 configured to be disposed inside of inside wall 60 of side 37 of base member 42. Cap wall 54 also has an interior side 62, forming interior space 63, that is configured to help guide cap 40 into its proper position inside base 42. In this embodiment, as shown in FIGS. 7 and 8, base member 42 has interior space 64 that includes inner wall 66 disposed generally circumferentially in interior space 64 inside and spaced apart from inside wall 60 forming groove 68. Groove 68 is sized and configured to receive cap wall 54 therein, as shown in FIG. 4, such that interior space 63 of cap 40 and interior space 64 of base 42 form interior chamber 38. To ensure that cap 40 is properly positioned for operation of bubbler 10, as more fully explained below, it is preferable that interior side 62 of cap wall 54 include one or more alignment ridges 70, best shown in FIG. 6, configured to be cooperatively engaged in alignment slots 72, best shown in FIG. 7, disposed along inner wall 66 in interior space 64 of base member 42. The solid portion of inner wall 66 prevents alignment ridges 70 from being placed between alignment slots 72. As is known in the art, other configurations for cap 40 and base 42 are possible to form housing 32 and interior chamber 38 for the bubbler 10 of the present invention, including the use of cap 40 with a shorter cap wall 54 (i.e., one that does not reach far into base 42) or no cap wall 54 at all.

As best shown in FIGS. 4 and 5, top 34 of housing 32 comprises a plurality of valve openings 74 that are each sized and configured to receive valve 76 disposed therein. Although the embodiment shown in the figures shows top 34 with eight such valve openings 74, it is known in the art that bubbler 10 can comprise fewer or greater number of valve openings 74 depending on its size and desired operating characteristics, including the number of individually controlled distribution lines 20 that are desired. Valve openings 74 are hydrologically connected to interior chamber 38 so that valve 76 may control the flow of water from inside chamber 38 to each individual distribution line 20. As further explained below, the preferred embodiment has valve openings 74 configured to be internally threaded to threadably receive the external threads of upper threaded section 78 of valve 76, as best shown on FIGS. 9 and 10. Top 34 of housing 32 can include valve rotational indicators 80 at or near each opening 74 to indicate the direction of rotation to open or close valve 76 and line indicators 82, also at or near each opening 74, to indicate which valve 76 corresponds to a particular distribution line 20 so that the user may know which valve 76 to adjust to increase or decrease the flow of water to plants 24 irrigated by that line 20.

Side wall 37 of base 42 has an outside wall 84 which can be shaped and configured for aesthetic and/or strength purposes. Base 42 also comprises a plurality of valve receiving members 86 disposed within the interior space 64 of base, as best shown in FIG. 7, for operatively receiving valve 76 to increase or decrease the flow to distribution lines 20. In the preferred embodiment, the number of valve receiving members 86 corresponds with the number of openings 74 in top 34 of cap 40. Alignment ridges 70 on cap wall 54 should be received in alignment slots 72 such that openings 74 in top 34 are substantially aligned above valve receiving member 86 so that valve 76 may operatively join to valve receiving member 86 to either allow water to flow to lines 20 or to close to prevent such flow. In the preferred embodiment, as shown in FIGS. 7 and 8, valve receiving member 86 has an opening 88 leading to a discharge passage 90 interconnecting interior chamber 38 and discharge port 92. Opening 88 is sized and configured to sealably receive reduced section 94 of valve 76 therein. The movement of reduced section 94 into and out of opening 88 opens and closes the hydrological communication between interior chamber 38 and discharge passage 90 to allow more or less water to flow to lines 20. Valve 76 can be moved to its fully open position (i.e., where reduced section 94 is spaced furthest apart from opening 88) to allow debris or contaminants to be flushed from bubbler 10. When reduced section 94 of valve 76 is fully engaged in opening 88, water flow to line 20 connected to that particular valve 76 will be completely shut-off. To provide an improved seal between valve 76 and discharge passage 90, opening 88 can include shoulder 96 sized and configured to tightly abut reduced section 94 and completely close off opening 88 from interior chamber 38, thereby preventing flow of any water out discharge passage 90 and to any distribution line 20 connected thereto.

Figure 9:
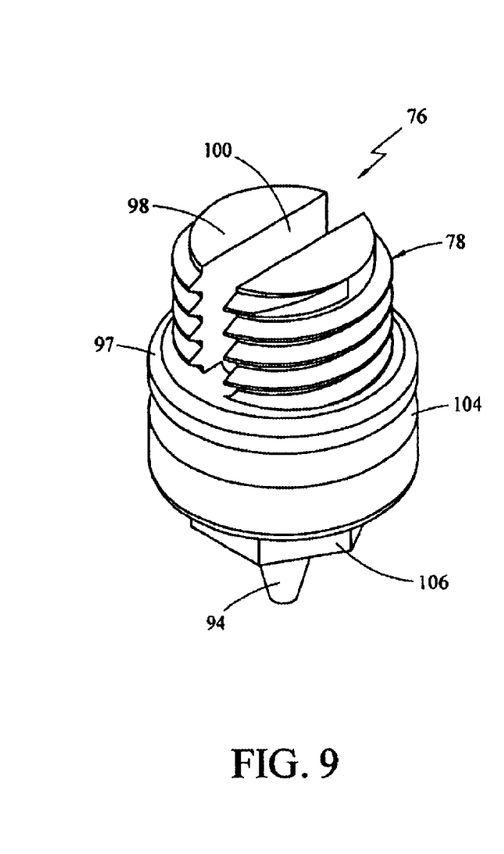
FIG. 9 is an isometric view of the valve of the present invention.
Figure 10:
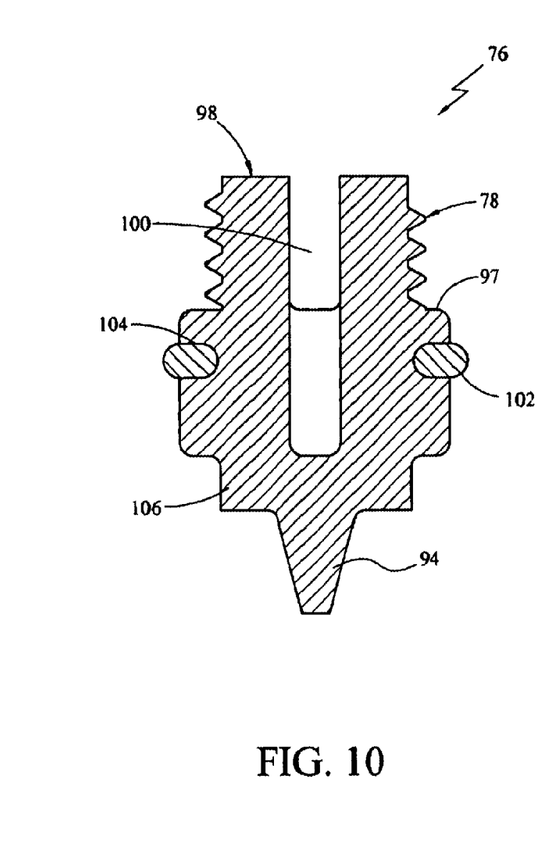
FIG. 10 is a cut-away side view of the valve of the present invention.

As best shown in FIGS. 9 and 10, reduced section 94 of valve 76 is in the general shape of a needle so that it may be easily and effectively guided into opening 88 by operation of valve 76. As stated above, valve 76 comprises an upper threaded section 78 configured to be threadably received in threaded valve opening 74. In the preferred embodiment shown in the drawings, valve opening 74 and upper threaded section 78 are configured to permit valve 76 to move up and down in valve opening 74 from below top 34 so as to selectively engage opening 88 on the various valve receiving members 86. The placement of valve 76 into valve opening 74 from below and the configuration of shoulder 97 on valve 76, as shown in the figures, prevents the user from completely removing valve 76 from housing 32 by merely adjusting the flow rate too far, which would allow water to flow out of bubbler 10 through valve opening 74. Shoulder 97 on valve 76 should be sized to have a greater diameter than valve opening 74. To assist the user with adjusting the upward and downward movement of valve 76 and, therefore, the opening and closing of discharge passage 90, the top 98 of valve 76 is provided with an adjusting slot 100 suitable for receiving a screwdriver, coin or other like devices to rotate valve 76 inside opening 88. Rotation of upper threaded section 78 of valve 76 will cause valve 76 to move up or down relative to opening 88. To ensure that no fluid flows upward to exit housing 32 past valve 76, a sealing member, such as the O-ring 102 shown in FIG. 10, is engaged between valve opening 74 and valve 76. As shown in FIGS. 9 and 10, valve 76 of the preferred embodiment of the present invention includes an O-ring slot 104 for receiving O-ring 102. To assist with the installation of valve 76 into valve opening 74, valve 76 can include flats 106 or other devices for turning valve 76 in opening 74 from below (as explained above, the typically preferred manner in which valve 76 would be installed in valve opening 74).

To connect distribution lines 20 to bubbler 10, the preferred embodiment of the present invention utilizes outlet members 110 having a body portion 112, insert portion 114 and a line connection portion 116, as best shown in FIG. 3. The preferred outlet member 110, commonly used in the drip irrigation art, comprises an elbow shaped body portion 110 disposed between reduced diameter insert portion 114 and line connection portion 116. Outlet member 110 includes a passageway therethrough (not shown) to interconnect discharge passage 90 to the distribution line 20 at line connection portion. For attachment to bubbler 10, insert portion 114 should be sized and configured so as to be inserted into discharge passage 90 through port 92 such that when insert portion 114 is inserted into passage 90 it is securely held in place yet capable of being rotated or swivelled inside passage 90, and relative to passage 90, so that line connection portion 116 can be moved to face in the desired direction. The preferred line connection portion 116 comprises a barb 118 suitable for securely engaging distribution line 20. Naturally, it is barb 118 that makes removal of line 20 from bubbler 10 so difficult and why it is beneficial to include a rotatable coupling 44 thereon. If desired, outlet member 110 can be fixedly placed inside discharge passage 90.

As is well known in the art, water from the source of water may contain various impurities that can clog or otherwise damage various components of bubbler 10, lines 20 and emitters 28. To reduce the likelihood of such impurities getting into bubbler 10 or beyond, the preferred embodiment of the present invention includes a filter element, such as the screened section 120, at the bottom end of passage 52 at or near inlet 50. To reduce the number of parts that the user of bubbler 10 must handle, it is preferred that screened section 120 is made integral to spacer member 46, as shown in FIGS. 4 and 8. As shown in the figures, screened section 120 can comprise a plurality of spaced apart narrow slots 122 positioned in the flow stream such that any water entering bubbler 10 must pass through screened section 120. To prevent water from bypassing screened section 120, the preferred bubbler 10 also comprises a sealing member, such as an O-ring, disposed against lower shoulder 124, shown in FIG. 8, to seal against the top of riser member 18. As shown in FIGS. 7 and 8, base member 42 can comprise a slot 126 for rotatably receiving coupling 44 and an extended portion 128 for preventing coupling 44 from sliding off base member 42. In the preferred embodiment of the present invention, coupling 44 snap fits past extended portion 128 into slot 126.

In use, the bubbler 10 of the present invention configured with the preferred embodiments described above, is installed in a drip irrigation system 12 having riser 18 with a male threaded end by rotating the female threaded coupling 44 onto riser 18. Water from conduit 14 rises flows pressure through riser 18 past inlet 50 of coupling 44 into passage 52 and interior chamber 38 of housing 32. Water in interior chamber 38 flows over the open openings 88 into discharge passage 90 and out outlet member 110 to distribution lines 20 to water plants 24. The user of bubbler 10 can increase or decrease the flow to plants 24 by rotating valve 76 in valve opening 74 by utilizing a coin or screwdriver to turn adjustment slot 100 at top 98 of valve 76. Rotating slot 100 causes upper threaded section 78 of valve 76 to rotate and move valve 76 up or down relative to opening 88. As valve 76 moves downward into opening 88, less water can flow into discharge passage 90. When reduced section 94 of valve 76 abuts against shoulder 96 of opening 88, the flow of water out to the particular distribution line 20 connected to that valve 76 will completely cease. When flow is through that line 20 is desired, the user merely has to rotate valve 76 so that it moves upward, thereby moving reduced section 94 of valve 76 away from opening 88 to let water flow through discharge passage 90.

Use of bubbler 10 of the present invention has certain significant advantages over prior art bubblers, including the ability to selectively completely shut-off water flow to a particular distribution line without the need of plugs or caps at the end of outlet member 110. Bubbler 10 also allows for selective control of the amount of water flowing to each distribution line 20 without the need to disassemble bubbler 10 in any manner. Use of integral screened section 120 prevents particulate matter from getting inside bubbler 10, lines 20 or emitters 28 where they could cause harm. Because screened section 120 is integral, it is not necessary for the user to handle a separate screen member when it is necessary to clean the screen of any built-up materials. To clean the screen, the user merely unscrews coupling 44 from riser 18. With the bubbler of the present invention, this can be done without removing distribution lines 20 from their respective outlet members. Besides avoiding the need to pull off or cut the lines, there is no likelihood that the lines could become mixed up, therefore requiring resetting of each valve 76 to obtain the desired flow to plants 24 on the associated distribution line 20.

While there are shown and described herein certain specific alternative embodiments of the invention, it will be readily apparent to those skilled in the art that the invention is not so limited, but is susceptible to various modifications and rearrangements in design and materials without departing from the spirit and scope of the invention. Hence, it is to be understood that the invention is capable of variation and modification within the scope of the appended claims. In particular, it should be noted that the present invention is subject to modification with regard to the dimensional relationships set forth herein and modifications in assembly, materials, size, shape and use.

What is claimed is:

1. A bubbler for use in a drip irrigation system having one or more distribution lines, comprising:

a housing having a cap member with a top, a base member with a bottom and a side wall, said cap member, said base member and said side wall forming an interior chamber in said housing, said cap member having one or more alignment ridges and said base member having one or more alignment slots, one of said alignment ridges received in one of said alignment slots when said cap member and said base member are joined to form said interior chamber;

a plurality of valve openings in said top of said housing, each of said valve openings in communication with said interior chamber;

a valve threadably received in at least one of said valve openings, said valve having a reduced section extending generally downward into said interior chamber;

at least one valve receiving member at said bottom of said housing in said interior chamber, said valve receiving member having an opening therein in fluid flow connection with said interior chamber and in corresponding relationship with said valve, said opening configured to receive said reduced section of said valve, said opening in said valve receiving member hydrologically connected to a discharge passage; and an outlet member attached to said housing at said discharge passage, said outlet member configured for attachment to one of the distribution lines.

2. The bubbler according to claim 1 further comprising a coupling connected to said bottom of said housing, said coupling configured for rotatable attachment to a water conduit member of the drip irrigation system.

3. The bubbler according to claim 1, wherein said base member further comprises an inner wall generally circumferentially disposed in said base member and spaced apart from said side wall to form a groove, said cap member received in said groove when said cap member and said base member are joined to form said interior chamber, said one or more alignment slots disposed in said inner wall.

4. The bubbler according to claim 1, wherein said valve and said valve opening are configured to allow said reduced section of said valve to move upward and downward relative to said valve receiving member so as to selectively open or close said opening.

5. The bubbler according to claim 4, wherein the hydrological connection between said opening is securely closed when said reduced section of said valve abuts said opening.

6. The bubbler according to claim 1 further comprising a spacer member attached to said bottom of said housing, said spacer member forming an inlet passage to said interior chamber, said spacer member having a screened member attached thereto at one end of said inlet passage.

7. The bubbler according to claim 6, wherein said spacer member is integral with said bottom of said housing and said screened member is integral with said spacer member.

8. A bubbler for use in a drip irrigation system having one or more distribution lines, comprising:

a housing having a cap member with a top, a base member with a bottom and a side wall, said cap member, said base member and said side wall forming an interior chamber in said housing, said cap member having one or more alignment ridges and said base member having one or more alignment slots, one of said alignment ridges received in one of said alignment slots when said cap member and said base member are joined to form said interior chamber;

a spacer member attached to said bottom of said housing, said spacer member forming an inlet passage to said interior chamber;

a coupling rotatably connected to said spacer member, said coupling configured for attachment to a water conduit member of the drip irrigation system;

a plurality of valve openings in said top of said housing, each of said valve openings in communication with said interior chamber;

a valve threadably received in at least one of said valve openings, said valve having a reduced section extending generally downward into said interior chamber;

at least one valve receiving member at said bottom of said housing in said interior chamber, said valve receiving member having an opening therein in fluid flow connection with said interior chamber and in corresponding relationship with said valve, said opening configured to receive said reduced section of said valve, said opening in said valve receiving member hydrologically connected to a discharge passage; and an outlet member attached to said housing at said discharge passage, said outlet member configured for attachment to one of the distribution lines.

9. The bubbler according to claim 8, wherein said base member further comprises an inner wall generally circumferentially disposed in said base member and spaced apart from said side wall to form a groove, said cap member received in said groove when said cap member and said base member are joined to form said interior chamber, said one or more alignment slots disposed in said inner wall.

10. The bubbler according to claim 8, wherein said valve and said valve opening are configured to allow said reduced section of said valve to move upward and downward relative to said valve receiving member so as to selectively open or close said opening, said reduced section configured to securely close said opening when said reduced section abuts said opening.

11. The bubbler according to claim 8 further comprising a screened member integral with said spacer member and disposed in said inlet passage.

12. A bubbler for use in a drip irrigation system having a plurality of distribution lines, comprising:

a housing having a cap member with a top, a base member with a bottom and a side wall disposed circumferentially thereabout, said housing forming an interior chamber therein, said cap member having one or more alignment ridges, said base member having one or more alignment slots, one of said alignment ridges received in one of said alignment slots;

a plurality of valve openings in said top of said housing, each of said valve openings in communication with said interior chamber;

a valve threadably received in each of said valve openings, each of said valves having a reduced section extending generally downward from said valve openings into said interior chamber;

a plurality of valve receiving members at said bottom of said housing in said interior chamber, each of said valve receiving members having an opening therein in fluid flow connection with said interior chamber and in corresponding relationship with one of said valves, said opening configured to receive said reduced section of one of said valves and hydrologically connected to a discharge passage, said valve and said valve opening configured to allow said reduced section of said valve to move upward and downward relative to said valve receiving member so as to selectively open or close said opening, said reduced section configured to securely close said opening when said reduced section abuts said opening; and a plurality of outlet members attached to said housing at said discharge passage, each of said outlet members configured for attachment to one of the distribution lines.

13. The bubbler according to claim 12 further comprising a coupling connected to said bottom of said housing, said coupling configured for rotatable attachment to a water conduit member of the drip irrigation system.

14. The bubbler according to claim 12, wherein said base member further comprises an inner wall generally circumferentially disposed in said base member and spaced apart from said side wall to form a groove, said cap member received in said groove.

15. The bubbler according to claim 14 further comprising a spacer member attached to said bottom of said housing, said spacer member forming an inlet passage to said interior chamber, said spacer member having a screened member integral therewith at one end of said inlet passage, said one or more alignment slots disposed in said inner wall.

16. A bubbler for use in a drip irrigation system having one or more distribution lines, comprising:

a housing having a top, a bottom and a side wall forming an interior chamber therein, said housing further comprising a cap member and a base member, said top located on said cap member and said bottom and said side wall located on said base member, said base member having an inner wall generally circumferentially disposed in said base member and spaced apart from said side wall to form a groove, said cap member received in said groove of said base member to form said interior chamber, said cap member having one or more alignment ridges, said base member having one or more alignment slots disposed in said inner wall, one of said alignment ridges received in one of said alignment slots when said cap member and said base member are joined to form said interior chamber;

a spacer member integral with said bottom of said housing, said spacer member forming an inlet passage to said interior chamber, said spacer member having a screened member integral therewith at one end of said inlet passage;

a plurality of valve openings in said top of said housing, each of said valve openings in communication with said interior chamber;

a valve threadably received in at least one of said valve openings, said valve having a reduced section extending generally downward into said interior chamber;

at least one valve receiving member at said bottom of said housing in said interior chamber, said valve receiving member having an opening therein in fluid flow connection with said interior chamber and in corresponding relationship with said valve, said opening configured to receive said reduced section of said valve, said opening in said valve receiving member hydrologically connected to a discharge passage; and an outlet member attached to said housing at said discharge passage, said outlet member configured for attachment to one of the distribution lines.

17. The bubbler according to claim 16 further comprising a coupling connected to said bottom of said housing, said coupling configured for rotatable attachment to a water conduit member of the drip irrigation system.

18. The bubbler according to claim 16, wherein said valve and said valve opening are configured to allow said reduced section of said valve to move upward and downward relative to said valve receiving member so as to selectively open or close said opening.

19. A bubbler for use in a drip irrigation system having one or more distribution lines, comprising:

a housing having a top, a bottom and a side wall forming an interior chamber therein, said housing further comprising a cap member and a base member, said top located on said cap member and said bottom and said side wall located on said base member, said base member having an inner wall generally circumferentially disposed in said base member and spaced apart from said side wall to form a groove, said cap member received in said groove of said base member to form said interior chamber, said cap member having one or more alignment ridges, said base member having one or more alignment slots disposed in said inner wall, one of said alignment ridges received in one of said alignment slots when said cap member and said base member are joined to form said interior chamber;

a spacer member attached to said bottom of said housing, said spacer member forming an inlet passage to said interior chamber;

a screened member disposed in said inlet passage, said screened member integral with said spacer member;

a coupling rotatably connected to said spacer member, said coupling configured for attachment to a water conduit member of the drip irrigation system;

a plurality of valve openings in said top of said housing, each of said valve openings in communication with said interior chamber;

a valve threadably received in at least one of said valve openings, said valve having a reduced section extending generally downward into said interior chamber;

at least one valve receiving member at said bottom of said housing in said interior chamber, said valve receiving member having an opening therein in fluid flow connection with said interior chamber and in corresponding relationship with said valve, said opening configured to receive said reduced section of said valve, said opening in said valve receiving member hydrologically connected to a discharge passage; and an outlet member attached to said housing at said discharge passage, said outlet member configured for attachment to one of the distribution lines.

20. The bubbler according to claim 19, wherein said valve and said valve opening are configured to allow said reduced section of said valve to move upward and downward relative to said valve receiving member so as to selectively open or close said opening.

* * * * *